(12) United States Patent
Matsuyama

(10) Patent No.: US 10,343,465 B2
(45) Date of Patent: Jul. 9, 2019

(54) PNEUMATIC TIRE

(71) Applicant: BRIDGESTONE CORPORATION, Chuo-ku, Tokyo (JP)

(72) Inventor: Ryunosuke Matsuyama, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 201 days.

(21) Appl. No.: 15/308,434

(22) PCT Filed: Apr. 23, 2015

(86) PCT No.: PCT/JP2015/063050
§ 371 (c)(1),
(2) Date: Nov. 2, 2016

(87) PCT Pub. No.: WO2015/170673
PCT Pub. Date: Nov. 12, 2015

(65) Prior Publication Data
US 2017/0050472 A1 Feb. 23, 2017

(30) Foreign Application Priority Data
May 7, 2014 (JP) ................................. 2014-095892

(51) Int. Cl.
*B60C 11/12* (2006.01)
*B60C 11/03* (2006.01)

(52) U.S. Cl.
CPC ...... *B60C 11/1281* (2013.01); *B60C 11/0304* (2013.01); *B60C 11/12* (2013.01);
(Continued)

(58) Field of Classification Search
CPC .................................. B60C 11/1218
See application file for complete search history.

(56) References Cited

U.S. PATENT DOCUMENTS 4,884,606 A * 12/1989 Matsuda ................. B60C 11/12
152/209.18
4,934,424 A * 6/1990 Kojima ................... B60C 11/12
152/209.25
(Continued)

FOREIGN PATENT DOCUMENTS

JP 2000094908 A 4/2000
JP 2002154308 A 5/2002
(Continued)

OTHER PUBLICATIONS

Ohashi, JP2010208428 google machine translation as viewed at https://translate.google.com/translate?hl=en&sl=ja&u=https://patents.google.com/patent/JP2010208428A/ja&prev=search on Jul. 23, 2018 (Year: 2010).*

*Primary Examiner* — Jodi C Franklin
(74) *Attorney, Agent, or Firm* — Kenja IP Law PC

(57) ABSTRACT

Wear resistance is improved. To that end, a pneumatic tire of the disclosure herein includes, on a tread surface 1, a sipe 4 extending in a direction intersecting a tire circumferential direction. A sipe width of the sipe becomes maximum at a predetermined depth direction position P1 at predetermined extending direction position P2 of the sipe, and gradually increases at the predetermined depth direction position P1 from both ends in the sipe extending direction to the predetermined extending direction position P2, and also gradually increases at the predetermined extending direction position P2 from both ends in the sipe depth direction to the predetermined depth direction position P1.

9 Claims, 8 Drawing Sheets

(52) U.S. Cl.
CPC ...... *B60C 11/1218* (2013.01); *B60C 11/1236* (2013.01); *B60C 2011/1209* (2013.01)

(56) References Cited

U.S. PATENT DOCUMENTS

| | | | |
|---|---|---|---|
| 6,681,824 B2 | 1/2004 | Lopez | |
| 2002/0017349 A1* | 2/2002 | Lopez | B60C 11/12 152/209.18 |
| 2009/0050248 A1* | 2/2009 | Ohashi | B60C 11/12 152/209.18 |
| 2013/0139937 A1* | 6/2013 | Gayton | B60C 11/0306 152/209.18 |

FOREIGN PATENT DOCUMENTS

| | | | |
|---|---|---|---|
| JP | 2005329793 | A | 12/2005 |
| JP | 2008290573 | A | 12/2008 |
| JP | 2010125977 | A | 6/2010 |
| JP | 2010208428 | A | 9/2010 |
| JP | 2011157011 | A | 8/2011 |
| JP | 2013107501 | A | 6/2013 |
| JP | 5270407 | B2 | 8/2013 |
| KR | 100869025 | B1 | 11/2008 |

\* cited by examiner

PNEUMATIC TIRE

TECHNICAL FIELD

This disclosure relates to a pneumatic tire.

BACKGROUND

Conventionally, there has been proposed a technology which, by optimizing a shape and an arrangement of a block land portion, reduces shear force generated in tread rubber at the time of kicking-out and suppressing a slipping phenomenon of the tread rubber on a road surface, thereby improving wear resistance (e.g., PLT 1).

CITATION LIST

Patent Literature

PLT 1: JP-A-2010-125977

SUMMARY

Technical Problem

Incidentally, when a sipe is provided to the tread surface, wear resistance of a tire is greatly affected by a design of the sipe. This will be described in more detail with reference to FIGS. 8A and 8B.

First, as illustrated in FIG. 8A, when a vertical load is applied from directly above, the larger the frictional force generated between a pair of sipe wall surfaces facing each other in a sipe 400 when the sipe wall surfaces come into contact with each other, the higher the rigidity of a tread rubber 50, and thus the occurrence of wear may be suppressed. Therefore, in order to suppress the occurrence of the wear due to a decrease in the rigidity, a sipe width of the sipe 400 is preferably small.

However, when the sipe width of the sipe 400 is extremely small, at the time of subsequent kicking-out, as illustrated on the right side of FIG. 8B, the sipe wall surfaces still come into contact with each other. As a result, excessive shear force is generated in the tread rubber 50, and the wear is likely to occur. On the other hand, when the sipe width of the sipe 400 is sufficiently large, as illustrated in the left side of FIG. 8B, the sipe wall surfaces do not come into contact with each other at the time of the kicking-out. As a result, the tread rubber 50 may flow (expand) into the sipe 400 and, in accordance therewith, the shear force of the tread rubber 50 is reduced, thereby suppressing the occurrence of the wear. In order to suppress the occurrence of the wear at the time of the kicking-out, therefore, the sipe width of the sipe 400 is preferably large.

However, when the sipe width of the sipe 400 is excessively large, upon application of the vertical load from directly above as described above, the sipe wall surfaces may not contact with each other, or the sipe wall surfaces may contact with each other without having sufficiently enhanced frictional force therebetween, thereby failing to sufficiently suppress the occurrence of the wear.

Therefore, in order to improve the wear resistance of the tire because of the design of the sipe, it is necessary to consider both the suppression of the occurrence of the wear at the time of the kicking-out and the suppression of the occurrence of the wear caused by the decrease in the rigidity.

In order to solve the above problem, it could be helpful to provide a pneumatic tire capable of improving the wear resistance.

Solution to Problem

A pneumatic tire of the disclosure herein is a pneumatic tire having, on a tread surface, a sipe extending in a direction intersecting a tire circumferential direction, wherein a sipe width of the sipe: becomes maximum at a predetermined depth direction position P1 between both ends of the sipe in a sipe depth direction, at a predetermined extending direction position P2 between both ends of the sipe in a sipe extending direction, gradually increases, at the predetermined depth direction position P1, along the sipe extending direction from the both ends of the sipe in the sipe extending direction to the predetermined extending direction position P2, and gradually increases, at the predetermined extending direction position P2, along the sipe depth direction from the both ends of the sipe in the sipe depth direction to the predetermined depth direction position P1.

According to the pneumatic tire of the disclosure herein, wear resistance may be improved.

Note that the "sipe width" at a depth direction position refers to a distance between the sipe wall surfaces when viewing, from the tread surface, a cross-section of tread rubber at the depth direction position along a virtual plane. Further, the "sipe extending direction" refers to a direction along a sipe width centerline, and the sipe "depth direction" refers to a direction perpendicular to the tread surface.

Also, the "tread surface" refers to a peripheral surface of an entire circumference of the tire which comes into contact with a road surface when a tire mounted on an applicable rim and filled with a prescribed internal pressure is turned while having a load corresponding to a maximum load capability applied thereto. Here, the "applicable rim" refers to a standard rim in an applicable size (Measuring Rim in STANDARDS MANUAL by ETRTO and Design Rim in YEAR BOOK by TRA) described in an industrial standard valid in an area where the tire is produced and used such as JATMA YEAR BOOK by JATMA (Japan Automobile Tire Manufacturers Association) in Japan, STANDARDS MANUAL by ETRTO (The European Tyre and Rim Technical Organisation) in Europe, YEAR BOOK by TRA (The Tire and Rim Association, Inc.) in the United States, and the like. Also, the "prescribed internal pressure" refers to an air pressure corresponding to the maximum load capability of an applicable size and ply rating described in the JATMA YEAR BOOK and the like mentioned above. The "maximum load capability" refers to maximum mass allowed be applied to the tire according to the above standards.

In the pneumatic tire of the disclosure herein, a maximum value of the sipe width of the sipe is preferably 1.0 mm or smaller. Thereby, the wear resistance may be further improved.

In the pneumatic tire of the disclosure herein, the sipe width at the predetermined depth direction position P1 at the predetermined extending direction position P2 of the sipe is preferably 0.4 to 1.0 mm. The sipe width at both ends of the sipe in the sipe extending direction at the predetermined depth direction position P1 of the sipe is preferably 0.3 to 0.8 mm. The sipe width at an end of the sipe in the sipe depth direction on the tread surface side at the predetermined extending direction position P2 is preferably 0.3 to 0.8 mm. The sipe width at an end of the sipe in the sipe depth direction on a sipe bottom side at the predetermined extending direction position P2 is preferably 0 to 0.6 mm. Thereby, the wear resistance may be further improved.

In the pneumatic tire of the disclosure herein, the predetermined depth direction position P1 preferably is located at a position remote from the tread surface by 30 to 70% of a sipe depth in the sipe depth direction. The predetermined extending direction position P2 preferably is located at a position remote from one end of the sipe in the sipe extending direction by 40 to 60% of a sipe extending length along the sipe extending direction. Thereby, the wear resistance may be further improved.

Note that the "sipe depth" described above is obtained by measuring, in a cross-section of the sipe along a sipe width direction, a distance from a sipe opening position opening to the tread surface to a sipe bottom position along a tire radial direction.

Further, the "sipe extending length" is obtained by measuring a length from one end of the sipe to the other along the sipe width centerline.

Advantageous Effect

According to the disclosure herein, a pneumatic tire capable of improving wear resistance may be provided.

DETAILED DESCRIPTION

Figure 1A:
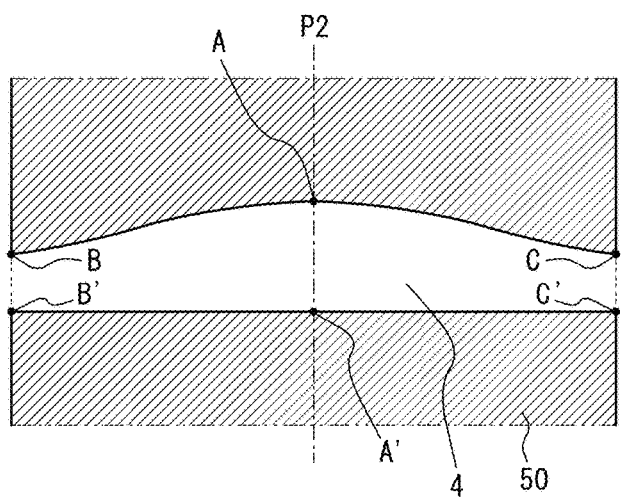
FIGS. 1A and 1B are diagrams illustrating an example of a sipe used in a pneumatic tire according to one embodiment of the disclosure herein.
Figure 1B:
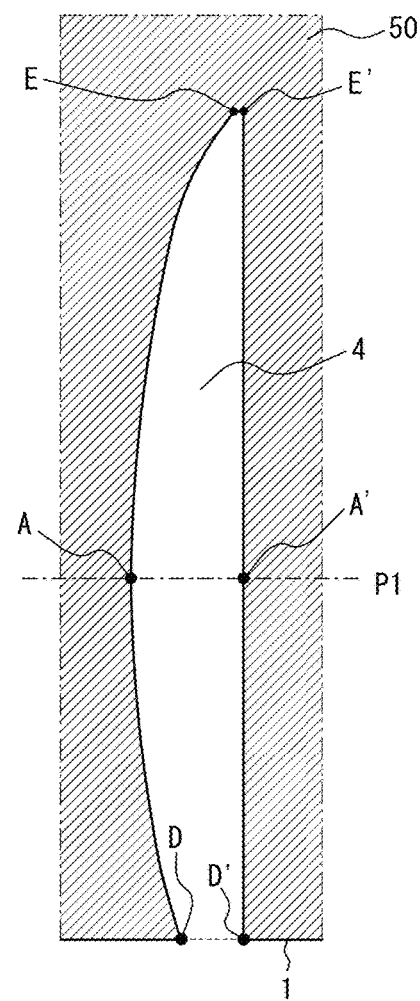
Figure 2:
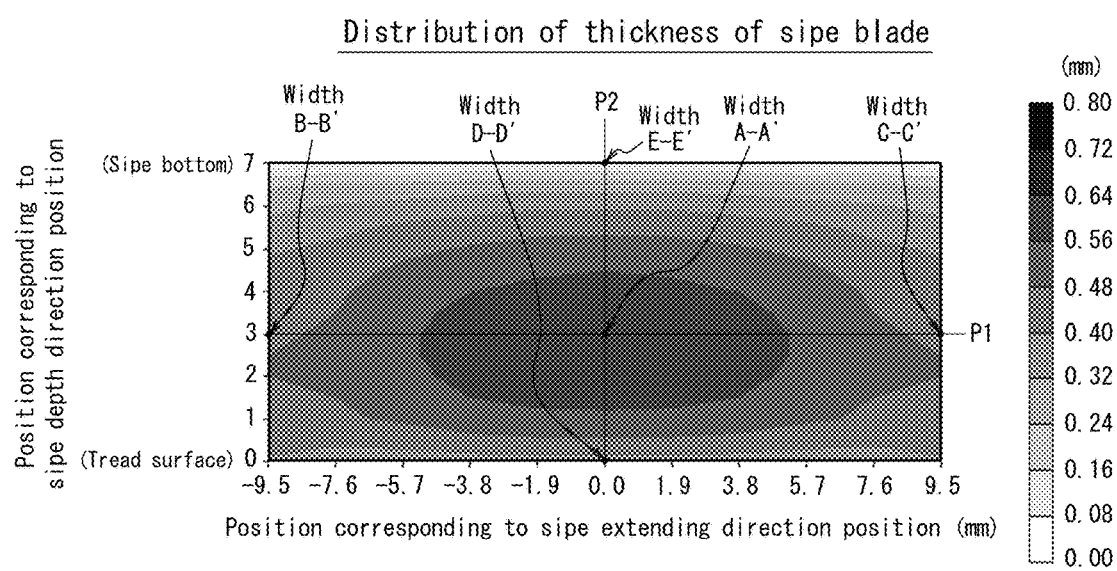
FIG. 2 is a diagram illustrating a distribution of a thickness of a sipe blade usable for the formation of the sipe in FIGS. 1A and 1B.

Referring to FIGS. 1A and 1B and FIG. 2, one embodiment of a pneumatic tire (hereinafter, also simply referred to as a "tire") of the disclosure herein will be described. Note that the tire of the present embodiment is particularly preferably used as a general tire (a summer tire or an all-season tire) non-specialized for ice or snow.

A tread surface 1 of the tire of the present embodiment is provided with at least one sipe 4 extending in a direction intersecting a tire circumferential direction. Other than the sipe 4, the tread surface 1 may be appropriately provided with a sipe extending along the tire circumferential direction, one or more main grooves extending in the tire circumferential direction, a plurality of sub-grooves extending in a direction intersecting the main groove, a plurality of blocks formed by the main groove and the sub-grooves, and the like. However, such a tread pattern is not particularly limited.

FIG. 1A illustrates the sipe 4 in a cross-section of a tread rubber 50 along a virtual plane parallel to the tread surface 1 at a predetermined depth direction position P1 (see FIG. 1B and FIG. 2) between both ends of the sipe 4 in a depth direction thereof. FIG. 1B illustrates the sipe 4 in a cross-section of the tread rubber 50 along the depth direction and a width direction of the sipe 4 at a predetermined extending direction position P2 (see FIG. 1A and FIG. 2) between both ends of the sipe 4 in an extending direction thereof. FIG. 2 illustrates a distribution of a thickness of a sipe blade usable for the formation of the sipe 4 of FIGS. 1A and 1B by molding, and a horizontal axis indicates a position corresponding to an extending direction position of the sipe 4 while a vertical axis indicates a position corresponding to a depth direction position of the sipe 4. A lower end and an upper end of the vertical axis correspond to a position of the tread surface 1 and a position of a sipe bottom, respectively. Since a size of the sipe blade corresponds to a size of the sipe 4, a thickness of the sipe blade in FIG. 2 corresponds to a sipe width of the sipe 4.

As illustrated in FIG. 1A, in the sipe 4 of the present example, in a virtual plane parallel to the tread surface 1 at the predetermined depth direction position P1, one of the sipe wall surfaces facing each other linearly extends while the other, having the predetermined extending direction position P2 as a turning point (a vertex), extends along a curved shape protruding outward from the sipe 4. With such a design, the sipe width of the sipe 4, as illustrated in FIG. 2, at the predetermined depth position P1 of the sipe 4, gradually increases along the extending direction of the sipe 4 from both ends thereof (a left end and a right end of the sipe 4 illustrated in FIG. 1A) to the predetermined extending direction position P2.

As illustrated in FIG. 1B, further, in the sipe 4 of the present example, in a virtual plane along the depth direction and the width direction at the predetermined extension direction position P2, one of the sipe wall surfaces facing each other linearly extends while the other, having the predetermined depth direction position P1 as the turning point (the vertex), extends along a curved shape protruding outward from the sipe 4. With such a design, the sipe width of the sipe 4, as illustrated in FIG. 2, at the predetermined extending direction position P2, gradually increases along the depth direction of the sipe 4 from both ends thereof (a top end and a bottom end of the sipe 4 illustrated in FIG. 1B) to the predetermined depth direction position P1.

As can be seen from FIG. 2, the sipe width of the sipe 4 gradually increases from outer edges thereof (portions along both end faces of the sipe extending direction, the sipe bottom, and the tread surface 1) to a maximum width portion (a portion corresponding to a "width A-A'" in FIG. 2) corresponding to the predetermined depth direction position P1 and the predetermined extending direction position P2 of the sipe 4 and is maximized at the maximum width portion.

Here, "gradually increases" means to continuously increase (preferably, in a smooth manner as illustrated in this example) without becoming constant in the middle. In the distribution diagram of FIG. 2, although shading indicative of the thickness of the sipe blade appears to be changing stepwise, this is rendered so for the purpose of easy understanding. An actual thickness of the sipe blade indicated by a portion having the same shade in the figure continuously (in this example, smoothly) increases toward the maximum width portion described above.

Further, the "predetermined depth direction position P1" and the "predetermined extending direction position P2" in the depth direction and in the extending direction of the sipe 4, respectively, are not limited to a point as illustrated in the example of the figures but may be a region with some width. In this case, the sipe width is constant within the region.

In the tire of the present embodiment, when the sipe width is set as described above, the pair of sipe wall surfaces of the sipe 4 facing each other are brought into contact with each other at the time of the application of the load from directly above, and the frictional force between the sipe wall surfaces and thus the rigidity of the tread rubber are sufficiently secured, thereby suppressing the occurrence of the wear. At the time of kicking-out, further, since the tread rubber 50 is allowed to flow (inflate) into the sipe 4, shear force of the tread rubber is reduced, suppressing the wear. As described above, since both at the time of application of the load from directly above and at the time of the kicking-out, the wear may be suppressed, and thus the wear resistance may be improved.

Note that, although the sipe 4 of the present example corresponds to a sipe having, in its entirety, a sipe width the same as the maximum sipe width (the sipe width at the maximum width portion) of the sipe 4 of the present example from the viewpoint of allowing the tread rubber 50 to flow into the sipe 4 at the time of the kicking-out, since wear force between the sipe wall surfaces around the maximum width portion in the sipe 4 is further enhanced at the time of the application of the load from directly above, the sipe 4 may further improve the wear resistance. Further, since the sipe width may be smaller within the tread surface 1, tire steering stability may be improved.

In the tire of the present embodiment, the maximum sipe width of the sipe 4 is preferably 1.0 mm or less. Thereby, the rigidity of the tread rubber 50 is sufficiently secured, and the occurrence of the wear may be more effectively suppressed.

Also, from the viewpoint of allowing sufficient inflation of the tread rubber 50 into the sipe 4 at the time of the kicking-out, the maximum sipe width of the sipe 4 is preferably 0.4 mm or more.

In the tire of the present embodiment, the sipe width (a length of a line A-A' of FIG. 1A and FIG. 1B) at a position corresponding to the predetermined depth direction position P1 and the predetermined extending direction position P2 of the sipe 4 is preferably within a range of 0.4 to 1.0 mm, more preferably within a range of 0.5 to 0.7 mm (approximately 0.8 mm in the example of FIG. 2). The sipe widths (lengths of lines B-B' and C-C' of FIG. 1A) at both ends of the extending direction of the sipe 4 at the predetermined depth direction position P1 of the sipe 4 are both preferably within a range of 0.3 to 0.8 mm, more preferably within a range of 0.4 to 0.6 mm (approximately 0.6 mm in the example of FIG. 2). The sipe width (a length of a line D-D' of FIG. 1B) at the end of the depth direction of the sipe 4 on the tread surface at the predetermined extending direction position P2 of the sipe 4 is preferably within a range of 0.3 to 0.8 mm, more preferably within a range of 0.3 to 0.5 mm (approximately 0.5 mm in the example of FIG. 2). The sipe width (a length of a line E-E' of FIG. 1B) at the end of the depth direction of the sipe 4 on the sipe bottom at the predetermined extending direction position P2 of the sipe 4 is preferably within a range of 0.0 to 0.6 mm, more preferably within a range of 0.2 to 0.4 mm (approximately 0.2 mm in the example of FIG. 2).

At the time of the kicking-out, thereby, since the tread rubber 50 may be allowed to inflate into the sipe 4 to an extent that the pair of sipe wall surfaces of the sipe 4 facing each other substantially remains out of contact with each other, the shear force at the time of the kicking-out may be more effectively reduced. Thereby, both at the time of application of the load from directly above and at the time of the kicking-out, the occurrence of the wear may be more effectively suppressed. Also, since the sipe width may be sufficiently reduced within the tread surface 1, the tire steering stability may be improved.

Note that the sipe widths (the lengths of the lines B-B' and C-C' of FIG. 1A) at both ends of the extending direction of the sipe 4 at the predetermined depth direction position P1 of the sipe 4 may be different from each other.

In the tire of the present embodiment, further, the predetermined depth direction position P1 is remote from the tread surface 1 in the depth direction of the sipe 4 preferably by a range of 30 to 70% of the sipe depth, more preferably by a range of 40 to 50% (approximately 42% in the example of FIG. 2). Also, the predetermined extending direction position P2 is remote from one end of the extending direction of the sipe 4 along the extending direction of the sipe 4 preferably by a range of 40 to 60% of a sipe extending length, more preferably by a range of 45 to 55% (approximately 50% in the example of FIG. 2).

Accordingly, since the maximum width portion in the sipe 4 may be positioned in the vicinity of a position in the sipe 4 where an inflation amount of the tread rubber 50 into the sipe 4 becomes maximum at the time of the kicking-out, both at the time of application of the load from directly above and at the time of the kicking-out, the occurrence of the wear may be more effectively suppressed.

In the example illustrated in FIG. 2, the sipe width of the sipe 4 in the tread surface 1 is substantially constant throughout a length thereof in the extending direction. In this case, the tire steering stability may be improved.

In the example illustrated in FIG. 2, also, the sipe width at the sipe bottom of the sipe 4 (the sipe bottom of the sipe 4) is substantially constant throughout a length thereof in the extending direction. In this case, the effect of suppressing the wear occurring at the time of the application of the load from directly above may be sufficiently enhanced.

Note that a three-dimensional shape of the sipe 4 is not limited to that described with reference to FIGS. 1A and 1B but may be any shape.

Figure 3A:
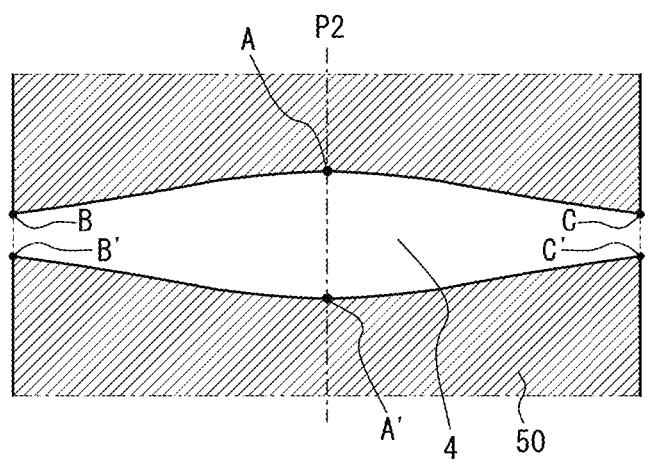
FIGS. 3A and 3B are diagrams illustrating a variation of the sipe.
Figure 3B:
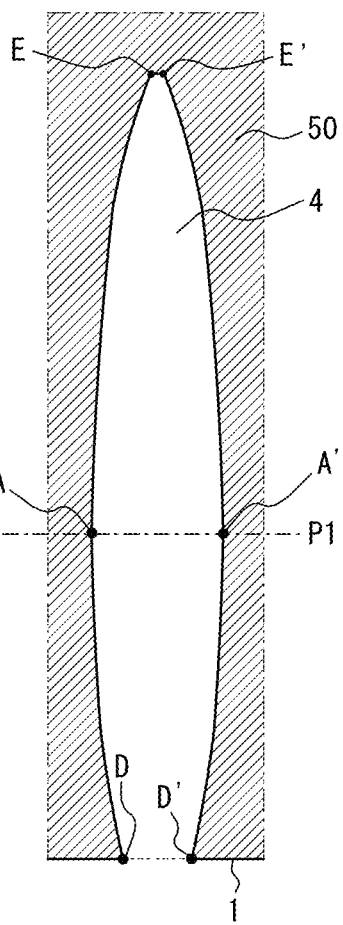

For example, in a variation illustrated in FIG. 3, the sipe 4, in each virtual plane described above at the position corresponding to the predetermined depth direction position P1 and the predetermined extending direction position P2, the pair of sipe wall surfaces facing each other extend along a curved shape protruding outward from the sipe 4.

Or, although not illustrated in the figure, in each virtual plane described above at the position corresponding to the predetermined depth direction position P1 and the predetermined extending direction position P2, one of the sipe wall surfaces facing each other may extend along a curved shape protruding in the same direction as the other sipe wall surface.

Further, in each virtual plane described above at the position corresponding to the predetermined depth direction position P1 and the predetermined extending direction position P2, the pair of sipe wall surfaces facing each other may extend along a bending (bent) shape instead of the curved shape, and a bending point may be provided at a plurality of positions over the entire length of the sipe 4 in the extending direction.

The sipe 4 of the present example is preferably disposed in a central region of the tread surface 1 to receive a highest contact pressure, whereby the wear resistance may be more reliably improved. In this case, to a shoulder region located outside of the central region in a tire width direction, without providing the sipes 4 of the present example, sipes having a design different from that of the sipe 4 of the present example (e.g. a sipe having a constant sipe width throughout a length thereof) may be provided.

In the tread surface 1, the sipe 4 may extend linearly, or curve or bend at one or more positions in the middle of the extending direction.

In the tread surface 1, also, each end of the sipe 4 may terminate in the land portion or open to another groove (the main groove, the sipe, and the like).

The sipe depth of the sipe 4 may be constant throughout the length thereof in the extending direction as illustrated in the example of FIG. 2, or may vary along the extending direction of the sipe 4.

Each of the sipes 4 provided in the tread surface 1 may have different design.

Figure 4:
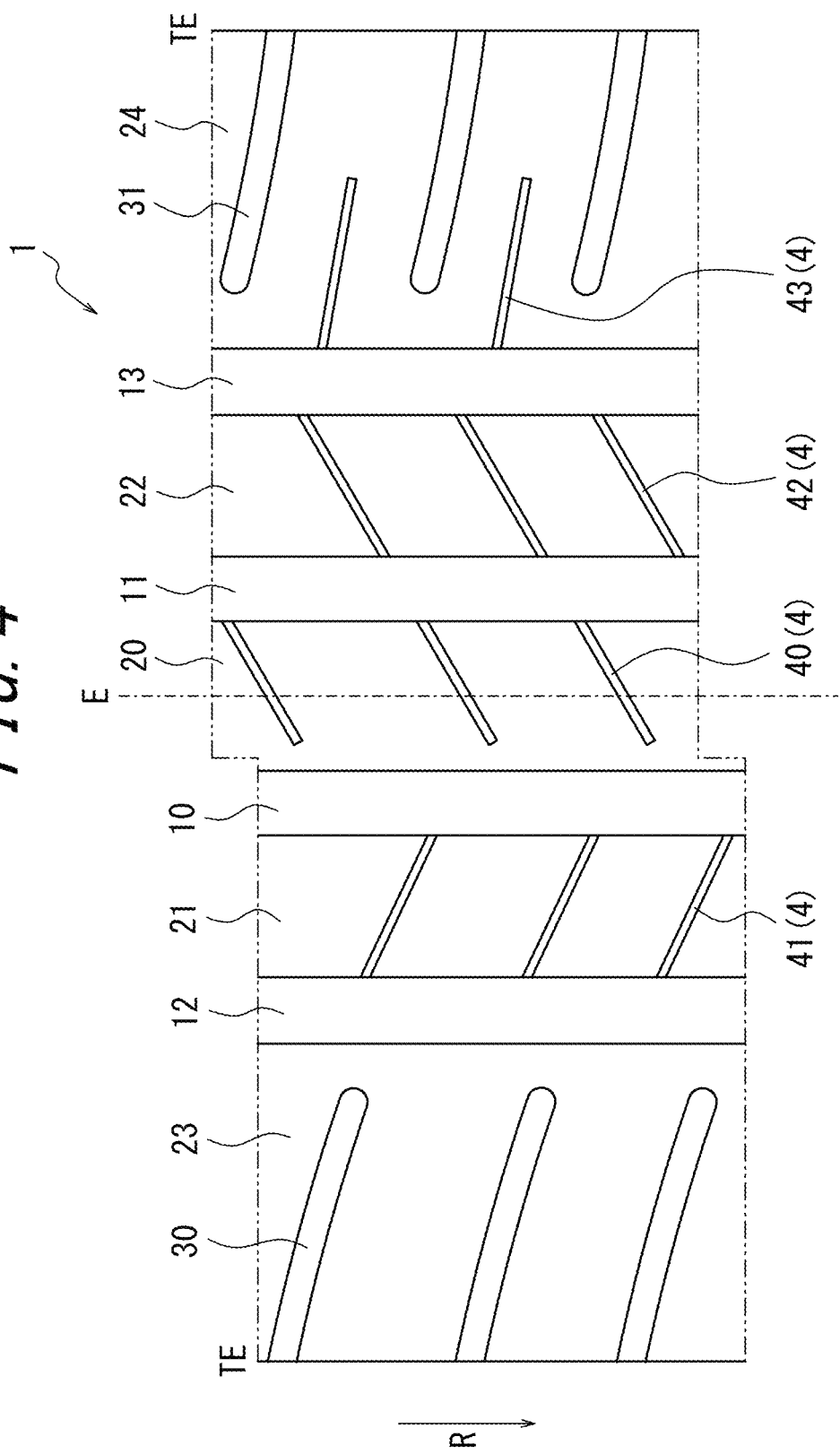
FIG. 4 is a partial development view of a tread pattern of the pneumatic tire according to one embodiment of the disclosure herein.

Next, referring to FIG. 4, the tread surface 1 of the pneumatic tire according to one embodiment of the disclosure herein will be described. FIG. 4 illustrates a partial development view of a tread pattern of the pneumatic tire according to one embodiment of the disclosure herein. The tread surface 1 described below is suitably applicable to each tire of the above examples. The tire in the example of FIG. 4 is preferably used with one side (a lower side in FIG. 4) in the tire circumferential direction as a front side of a rotational direction R. However, the tire of the present embodiment may suitably use either side in the tire circumferential direction as the front side of the rotational direction R.

In the example of FIG. 4, the tread surface 1 is provided with a plurality of sipes 4 (in particular, sipes 40 to 43) extending in a direction intersecting the tire circumferential direction.

The tread surface 1 is provided with, in the central region thereof, a total of four circumferential grooves 10 to 13 along the tire circumferential direction in such a manner that two each thereof are provided on either side of a tire equatorial plane E.

Note that the "central region" refers to a tire width direction region which, with the tire equatorial plane E in the center thereof, accounts for approximately 52% of the tire width direction between tread ground contact edges TE on both sides of the tire width direction.

In the central region of the tread surface 1, the two circumferential grooves 10 and 11 adjacent to each other in the tire width direction across the tire equatorial plane E form a rib-like center land portion 20 which spans across the tire equatorial plane E. The rib-like center land portion 20 is provided with a plurality of sipes 40 substantially parallel to each other and spaced apart from each other along the tire circumferential direction. These sipes 40 extend substantially linearly in a direction intersecting both the tire circumferential direction and the tire width direction and have one end opening to the circumferential groove 11, which is one of the two circumferential grooves forming the rib-like center land portion 20, and the other end positioned within the rib-like center land portion 20 between the tire equatorial plane E and the circumferential groove 10, which is the other one of the two circumferential grooves forming the rib-like center land portion 20.

Further, in the central region of the tread surface 1, a rib-like center land portion 21 is formed by the circumferential groove 10 adjacent to the circumferential groove 11 in the tire width direction across the tire equatorial plane E and the circumferential groove 12 positioned outside the circumferential groove 10 in the tire width direction, and a rib-like center land portion 22 is formed by the circumferential groove 11 adjacent to the circumferential groove 10 in the tire width direction across the tire equatorial plane E and the circumferential groove 13 positioned outside the circumferential groove 11 in the tire width direction. The rib-like center land portions 21 and 22 are provided with a plurality of sipes 41 and a plurality of sipes 42, respectively. The sipes 41 are spaced apart from each other and approximately parallel to each other along the tire circumferential direction, and so are the sipes 42. These sipes 41 and 42 substantially linearly extend in a direction intersecting both the tire circumferential direction and the tire width direction (in the example of FIG. 4, in a direction in which a portion of the sipe on a further inner side in the tire width direction locates on further front side of the tire rotational direction R). Each of the sipes 41 has one end opening to the circumferential groove 10, which is one of the grooves forming the rib-like center land portion 21, and the other end opening to the circumferential groove 12, which is the other groove forming the rib-like center land portion 21. Also, each of the sipes 42 has one end opening to the circumferential groove 11, which is one of the grooves forming the rib-like center land portion 22, and the other end opening to the circumferential groove 13, which is the other groove forming the rib-like center land portion 22.

On the other hand, in the tread surface 1, within a shoulder region outside the central region in the tire width direction, two circumferential grooves 12 and 13, located outermost in the tire width direction among the four circumferential grooves, and the tread ground contact edges TE form rib-like shoulder land portions 23 and 24, respectively. The rib-like shoulder land portion 23 is provided with a plurality of lug grooves 30 spaced apart from each other along the tire circumferential direction, and the rib-like shoulder land portion 24 is provided with a plurality of lug grooves 31 spaced apart from each other along the tire circumferential direction. The lug grooves 30 extend from the tread ground contact edge TE and terminate within the rib-like shoulder land portion 23 before reaching the circumferential groove 12 forming the rib-like shoulder land portion 23. Also, the lug grooves 31 extend from the tread ground contact edge TE and terminate within the rib-like shoulder land portion 24 before reaching the circumferential groove 13 forming the rib-like shoulder land portion 24. The rib-like shoulder land portion 24 is also provided with a plurality of sipes 43 apart from each other and approximately parallel to each other along the tire circumferential direction. These sipes 43 substantially linearly extend in a direction intersecting both the tire circumferential direction and the tire width direction (in the example of FIG. 4, in a direction in which a portion of the sipe on further outer side of the tire width direction locates on further front side of the tire rotational direction R). Each of the sipes 43 has one end opening to the circumferential groove 13 forming the rib-like shoulder land portion 24, and the other end terminating within the rib-like shoulder land portion 24 before reaching the tread ground contact edge TE.

Note that the "tread ground contact edge TE" refers to an outermost position of the tread surface 1 in the tire width direction.

Among the sipes provided to the tread surface 1, some sipes may be the sipe 4 of the present embodiment and others may be different therefrom.

For example, in the tread pattern illustrated in FIG. 4, the sipes 4 of the present embodiment may be used in the rib-like center land portion 20 alone which spans across the tire equatorial plane E while, in the rib-like center land portions 21 and 22 and the rib-like shoulder land portions 23 and 24 those do not span across the tire equatorial plane E, a plate-like sipe (a 2D sipe) with a constant sipe width or a 3D sipe having a bending portion in a sipe depth direction may be used.

Or, the sipe 4 of the present embodiment may be used in the rib-like shoulder land portions 23 and 24 alone while, in the rib-like center land portions 20 to 22, the plate-like sipe (the 2D sipe) with the constant sipe width or the 3D sipe having the bending portion in the sipe depth direction may be used.

It is especially preferable to use the sipe 4 of the present embodiment in the rib-like center land portion 20 alone which spans across the tire equatorial plane E and use the 3D sipe having the bending portion in the rib-like center land portions 21 and 22 and the rib-like shoulder land portions 23 and 24 those do not span across the tire equatorial plane E, for the following reason. That is, a tire typically has a difference in a diameter in a tire radial direction between the tire equatorial plane and the tread ground contact edge and, due to the difference, in the vicinity of the tire equatorial plane a shear strain (driving) tends to increase at the time of the kicking-out. Therefore, when the sipe 4 of the present embodiment which is less likely to deteriorate the shear strain (the driving) at the time of the kicking-out is used in the vicinity of the tire equatorial plane and, also, the 3D sipe having a great effect of enhancing the rigidity is used in the vicinity of the tread ground contact edge, the rigidity of an entire tread portion may be particularly enhanced.

Figure 7:
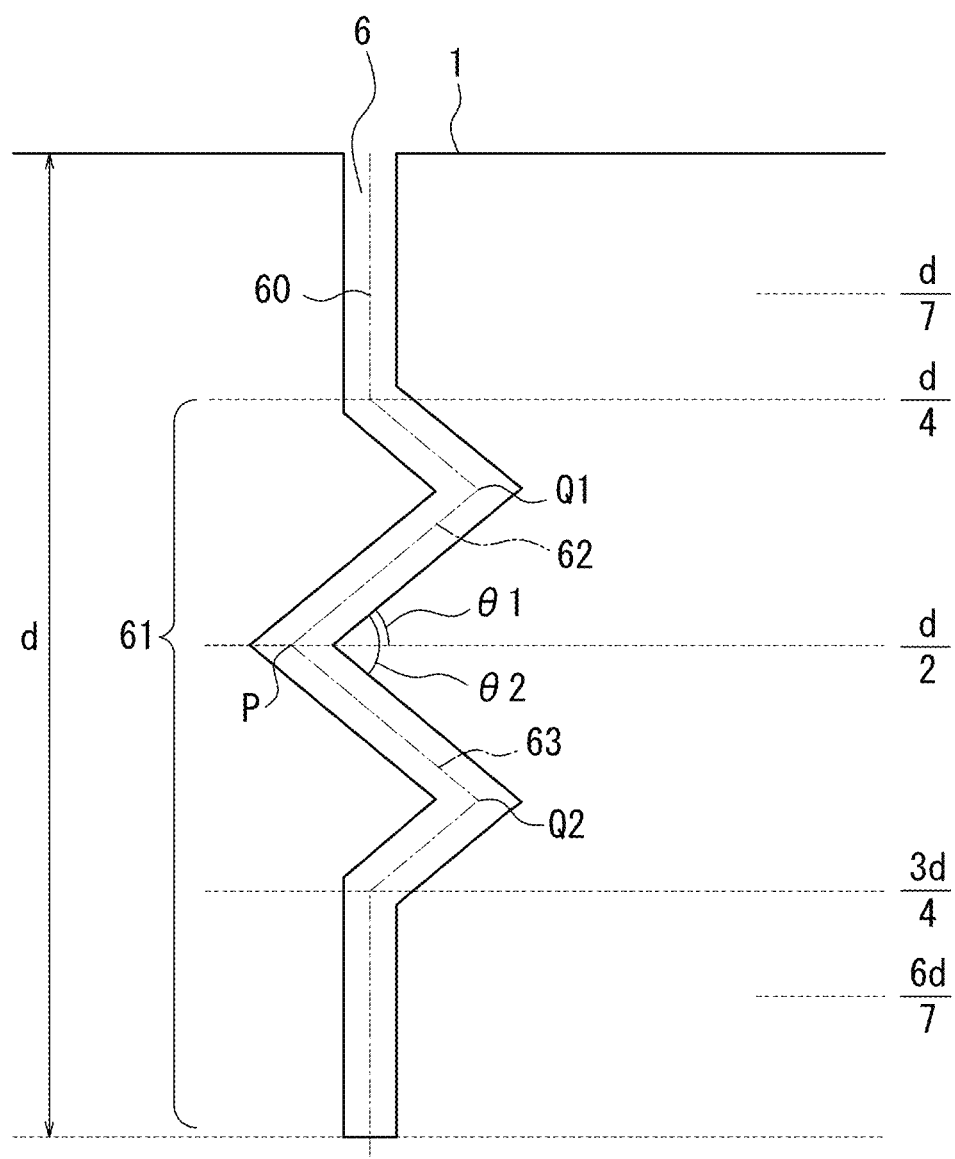
FIG. 7 is a diagram illustrating an example of a 3D sipe which may be provided to the pneumatic tire of the disclosure herein.
Figure 8A:
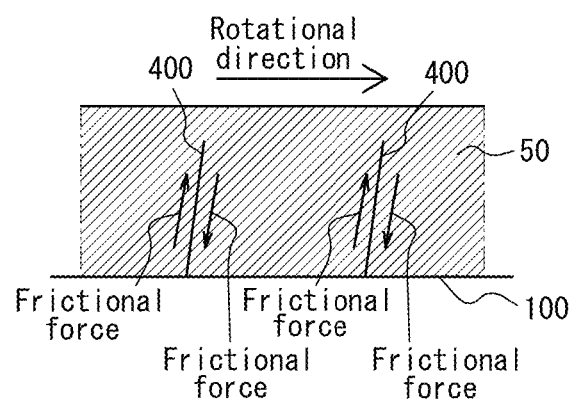
FIGS. 8A and 8B are diagrams illustrating an influence on wear resistance by a design of the sipe.
Figure 8B:
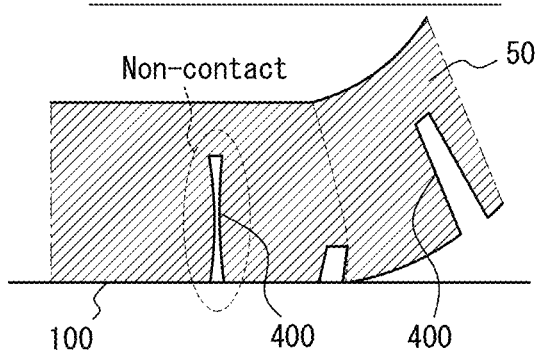
Figure 8B:
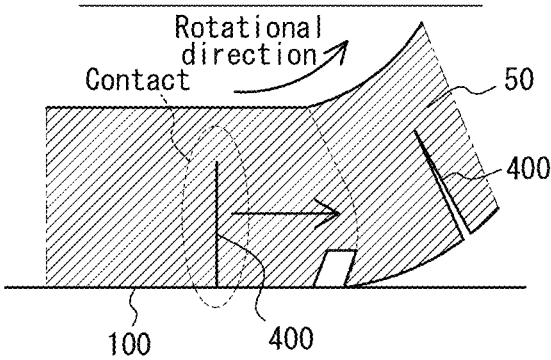

The 3D sipe is not particularly limited but may have a shape as illustrated in FIG. 7 by way of example. FIG. 7 illustrates an example of the 3D sipe, which may be used in the tire of the present embodiment, in a cross-section of the tread rubber along the sipe depth direction and a sipe width direction. A sipe 6 in FIG. 7 has a constant sipe width and includes, in the depth direction from the tread surface 1, a vertical portion 60 extending from the tread surface 1 in a normal direction thereof and a bending portion 61 bending to one side and the other with respect to the normal line, in the mentioned order. The bending portion 61 includes, when d represents a depth of the sipe 6, from the tread surface 1 in the depth direction, a first sub-bending point Q1 located in a sipe depth region between deeper than d/7 and d/2 or shallower from the tread surface 1, a main bending point P located in a depth region between d/4 or deeper and 3d/4 or shallower from the tread surface 1, and a second sub-bending point Q2 located in a depth region between d/2 or deeper and 6d/7 or shallower from the tread surface, in the mentioned order. Also, the bending portion 61 includes a first inclined portion 62 connecting the first sub-bending point Q1 and the main bending point P and a second inclined portion 63 connecting the main bending point P and the second sub-bending point Q2. An angle θ1 on an acute angle side formed by the first inclined portion 62 and a tangential direction of the tread surface 1 at an opening end of the sipe 6 satisfies 30°≤θ1≤60°. An angle θ2 on the acute angle side formed by the second inclined portion 63 and the tangential direction of the tread surface 1 at the opening end of the sipe 6 satisfies 30°≤θ2≤60°.

In the example of FIG. 4, since the central region of the tread surface 1 includes the rib-like center land portions 20 to 22 between the circumferential grooves 10 to 13, as compared with a tread surface which is further provided with, for example, width direction grooves extending in a direction intersecting the tire circumferential direction and thus has block land portions formed by the circumferential grooves and the width direction grooves, the rigidity of the tread rubber 50 may be further enhanced, leading to the improvement in the wear resistance.

Note that, in the central region of the tread surface 1, a block land portion may be formed in place of the rib-like center land portion.

Note that the tread surface 1 of the tire of the present embodiment is not limited to that of the example of FIG. 4 but, as long as having the sipe 4 extending in the direction intersecting the tire circumferential direction, may have any tread pattern.

Note that the sipe blade used for the formation of the sipe 4 during vulcanization molding of the tire may be formed by, for example, press working or a 3D printer.

According to the present embodiment, further, in the central region of the tread surface 1 in FIG. 4, distances between the sipes 4 (sipes 40 to 42) and other sipes 4 adjacent thereto in the tire circumferential direction are set to be 2.0 to 4.0 times longer than the sipe depth of the sipe 4. Thereby, the wear resistance is further improved.

Note that, for example, when the central region, in a different manner from the example of FIG. 4, is provided with grooves extending in the direction intersecting the tire circumferential direction in addition to the sipe 4, a gap between the sipe 4 and the groove adjacent thereto along the tire circumferential direction in the central region is 2.0 to 4.0 times longer than the sipe depth of the sipe 4.

For example, when the gap described above is smaller than 2.0 times of the sipe depth of the sipe 4, the land portion formed by the sipe 4 and other sipes 4 or grooves may not secure sufficient rigidity, leading to insufficient improvement in the wear resistance. On the other hand, when the gap described above is larger than 4.0 times of the sipe depth of the sipe 4, there is a risk that performance other than the wear resistance such as wet performance, steering stability, and the like is not sufficiently secured.

Here, in calculating a ratio of the gap to the sipe depth described above, when a plurality of sipes 4 provided on the tread surface 1 have different sipe depths, the deepest sipe depth among the sipe depths is used as the "sipe depth" of the sipe 4. Also, when the sipe depth varies within the sipe 4 along the extending direction thereof, a maximum value of the sipe depth of the sipe 4 is used as the "sipe depth". In the example of FIG. 2, the sipe 4 has a constant sipe depth along the extending direction thereof.

In the shoulder region of the tread surface 1, also, the gap along the tire circumferential direction between a pair of sipes 4 (the sipes 43) adjacent to one another in the tire circumferential direction is preferably 2.0 to 4.0 times of the sipe depth of the sipe 4. Thereby, the wear resistance may be further improved.

Also, a distance in the tire circumferential direction between a pair of sipes 4 adjacent to one another in the tire circumferential direction is preferably within a range of 10 to 40 mm. When the distance in the tire circumferential direction between the sipes 4 is less than 10 mm, the rigidity of the tread rubber 50 may not be sufficiently secured, leading to a risk that the wear resistance is not greatly improved. When the distance in the tire circumferential direction between the sipes 4 exceeds 40 mm, the number of sipes 4 provided on the tread surface 1 may be insufficient, leading to the risk that the performance other than the wear resistance such as the wet performance, the steering stability, and the like is not sufficiently secured.

Figure 5:
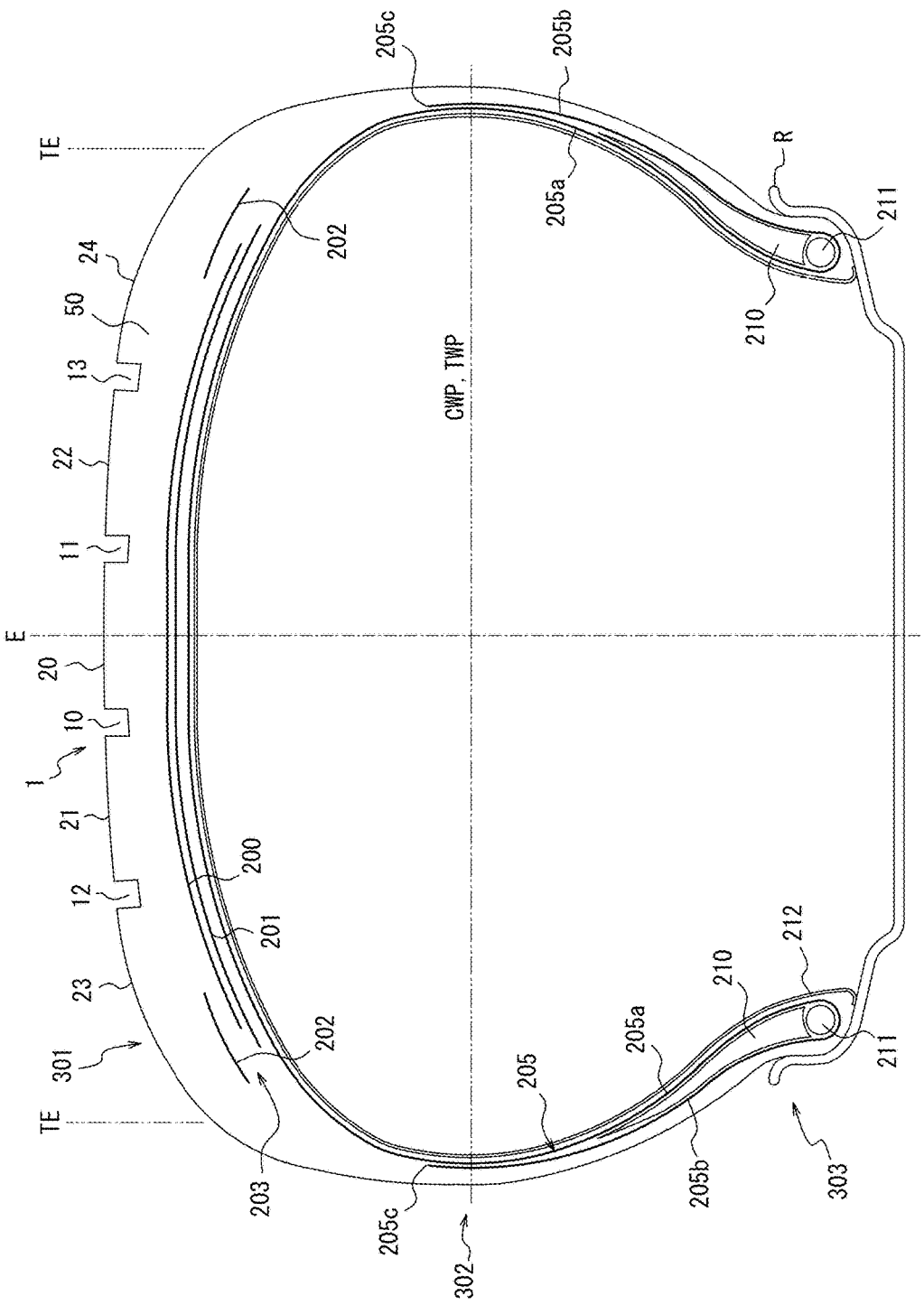
FIG. 5 is a cross-sectional view of the pneumatic tire in a tire width direction according to one embodiment of the disclosure herein.

Referring to FIG. 5, next, a tire internal structure of the pneumatic tire according to one embodiment of the disclosure herein will be described. FIG. 5 is a cross-sectional view of the pneumatic tire in the tire width direction according to one embodiment of the disclosure herein. The tire internal structure described below is suitably applicable to the tire of each example described above. In FIG. 5, the tire is mounted on an applicable rim R having a prescribed internal pressure and no load applied thereto.

The tire according to the present embodiment includes a tread portion 301, a pair of sidewall portions 302 continuous from the tread portion 301 and extending through an outer side in the tire width direction to an inner side in the tire radial direction, and a pair of bead portions 303 continuous from the respective sidewall portions 302 and extending to an inner side in the tire radial direction.

The tire of the present embodiment also includes a carcass 205 composed of one or more carcass plies troidally extending between the pair of bead portions 303 and including radially arranged cords, a belt 203 composed of one or more belt layers provided on an outer side of a crown portion of the carcass in the tire radial direction, the tread rubber 50 provided on an outer side of the belt 203 in the tire radial direction, and a bead core 211 embedded in the bead portion 303. An outer surface of the tread rubber 50 forms the tread surface 1.

The carcass 205 includes a carcass body 205a extending from the bead portion 303 to the tread portion 301 via the sidewall portion 302, and a carcass turn-up portion 205b wound up outward about the bead core 211 from an inner side in the tire width direction. Although in the example of FIG. 5 the carcass 205 is composed of one carcass ply in which a ply cord is coated with coating rubber, the carcass 205 may be formed by laminating a plurality of carcass plies.

Also, although a metal cord, especially a steel cord is most commonly used as the ply cord constituting the carcass ply, an organic fiber cord may be used. The steel cord may include steel as a main component and various trace inclusions such as carbon, manganese, silicon, phosphorus, sulfur, copper, chromium, and the like.

The tire of the present embodiment further includes a bead filler 210 disposed between the carcass main body 205a and the carcass turn-up portion 205b so as to enforce the bead portion 303, and an inner liner 212 having excellent air impermeability disposed on an inner side of the carcass 205 within the tire.

Although the tread rubber 50 is composed of a single rubber layer in the example of FIG. 5, the tread rubber 50 may be composed of a plurality of different rubber layers in the tire radial direction. The plurality of rubber layers described above may have different tangent loss, modulus, hardness, glass transition temperature, material, and the like. Also, ratios of thicknesses of the plurality of rubber layers in the tire radial direction may vary in the tire width direction. Also, a bottom portion and the like of the circumferential grooves 10 to 13 may be composed of a rubber layer different from that in its surrounding region.

Further, the tread rubber 50 may be composed of a plurality of different rubber layers in the tire width direction. The plurality of rubber layers described above may have different tangent loss, modulus, hardness, glass transition temperature, material, and the like. Also, ratios of lengths of the plurality of layers in the tire width direction may vary in the tire radial direction. Further, a limited region such as an area in the vicinity of the circumferential grooves 10 to 13 alone, an area in the vicinity of the tread ground contact edge TE alone, the rib-like shoulder land portions 23 and 24 alone, the rib-like center land portion 20 to 22 alone, or the like may be composed of a rubber layer different from that in its surrounding region.

In the example of FIG. 5, the belt 203 is composed of cords inclined with respect to the tire circumferential direction, and made up of two inclined belt layers 200 and 201 in which the cords cross each other between the layers, and a circumferential cord layer 202 covering tire width direction end portions alone of the inclined belt layers 200 and 201 from on an outer side thereof in the tire radial direction. The circumferential cord layer 202 is composed of cords extending along the tire circumferential direction. However, the belt 203 is not limited to the structure as described above but may have various existing structures in the pneumatic tire used for passenger cars. In particular, the belt 203 is composed of cords inclined with respect to the tire circumferential direction and, by way of example, has a structure made up of two inclined belt layers alone in which the cords are crossing each other between the layers and having different lengths in the tire width direction. Or, the belt 203 may include two inclined belt layers in which the cords are crossing each other between the layers and the circumferential cord layer covering the majority of the inclined belt layers across the tire equatorial plane from the outer side in the tire radial direction.

Note that one inclined belt layer alone may be provided. Or, the inclined belt layer may be substantially composed of one layer by using a pair of inclined belt layers covering half the width of the tire. In this case, the cords of the pair of inclined belt layers intersect with each other.

Here, as illustrated in the example of FIG. 5, when the plurality of inclined belt layers 200 and 201 are provided, a maximum width (a length in the tire width direction) of the inclined belt layer 201 having the largest width is preferably 90 to 115% of a tread width, more preferably 100 to 105%. Here, the "tread width" refers to a distance in the tire width direction between the tread ground contact edges TE.

As the cord constituting the inclined belt layers 200 and 201, although a metal cord, especially the steel cord is most commonly used, the organic fiber cord may be also used. The steel cord may include steel as the main component and various trace inclusions such as carbon, manganese, silicon, phosphorus, sulfur, copper, chromium, and the like.

Or, as the cord constituting the inclined belt layers 200 and 201, a monofilament cord or a cord composed of multiple twisted filaments may be used. A twist structure may adopt various designs, with various cross-sectional structures, twisting pitches, twisting directions, and distances between filaments adjacent to each other. Further, a cord made by twisting the filaments of different materials may be used, and a cross-sectional structure thereof is not particularly limited but may have various twisted structures such as single-twist, layer twist, multi twist, and the like.

An inclination angle of the cords constituting the inclined belt layers 200 and 201 is preferably 10 degrees or more and 30 degrees or less with respect to the tire circumferential direction.

As the circumferential cord layer 202, a corrugated cord may be used in order to enhance breaking strength. Similarly, to increase the breaking strength, a high elongation cord (having elongation at break of, for example, 4.5 to 5.5%) may be used.

As the cord constituting the circumferential cord layer 202, various materials may be adopted. Typically, rayon, nylon, polyethylene naphthalate (PEN), polyethylene terephthalate (PET), aramid, glass fibers, carbon fiber, steel, and the like may be adopted. From the viewpoint of weight reduction, the organic fiber cord is particularly preferred.

As the cord constituting the circumferential cord layer 202, the monofilament cord, the cord made by twisting a plurality of filaments, and a hybrid cord made by twisting filaments made of different materials may be adopted.

A thread count of the circumferential cord layer 202 is generally in a range of 20 to 60 cords/50 mm but not limited thereto.

Further, the circumferential cord layer 202 may have a distribution of rigidity, material, the number of layers, the thread count, and the like in the tire width direction. For example, the number of layers may be increased at end portions alone in the tire width direction, or in the center portion alone.

The circumferential cord layer 202 may be designed to be wider or narrower than the inclined belt layers 200 and 201. For example, the circumferential cord layer 202 may have a width at 90 to 110% of the inclined belt layer 201, which is wider than the inclined belt layer 200.

Forming the circumferential cord layer 202 as a spiral layer is particularly advantageous in terms of manufacturing.

Or, the circumferential cord layer 202 may be composed of a strip-shape cord in which a plurality of core filaments arranged parallel to one another in a plane are bundled by a wrapping filament while maintaining the aforementioned parallel arrangement.

Or, the circumferential cord layer 202 may be omitted.

The carcass 205 may employ various structures in the pneumatic tire. For example, in the example of FIG. 5, although a carcass maximum width position CWP in the tire radial direction locates at an approximate central position between the bead portion 303 and the tread portion 301 in the tire radial direction, the carcass maximum width position CWP in the tire radial direction may be positioned closer to the bead portion 303 or the tread portion 301. For example, the carcass maximum width position CWP in the tire radial direction may be provided on an outer side of a bead base (an innermost end of the bead portion 303 in the radial direction, and the same applies hereinafter) in the tire radial direction within a range of 50 to 90% of a tire height (a length of the tire from an innermost end thereof in the tire radial direction to an outermost end).

A thread count of the cords constituting the carcass 205 is generally in a range of 20 to 60 cords/50 mm but not limited thereto.

In the example of FIG. 5, the carcass turn-up end 205c is positioned on an outer side of a tire radial direction outermost end of the bead filler 210 and a tire maximum width position TWP in the tire radial direction. Also, although in the example of FIG. 5 the carcass turn-up end 205c is positioned on an outer side of a tire width direction end of the belt 203 in the tire width direction, the carcass turn-up end 205c may be positioned on an inner side of the tire width direction end of the belt 203 in the tire width direction. Or, the carcass turn-up end 205c may be positioned on an inner side of the outermost end of the bead filler 210 in the tire radial direction. Also, when a plurality of carcass plies are provided, each of the carcass plies may have the turn-up end 205c at different positions in the tire radial direction. Or, a structure in which, without the turn-up end 205c at all, an end of the carcass body 205a is pinched by a plurality of bead core members or wound about the bead core 211 may be employed.

The tire maximum width position TWP in the tire radial direction may be provided on an outer side of the bead base in the tire radial direction within a range of 50 to 90% of the tire height.

Although in the example of FIG. 5 the carcass maximum width position CWP in the tire radial direction matches the tire maximum width position TWP, these positions may be different from each other.

Further, the sidewall portion 302 may have a rim guard.

Note that the tire of the present embodiment may omit the bead filler 210.

The bead core 211 may have various structures in the pneumatic tire including a circular shape or a polygonal shape when viewed in a cross-section in the tire width direction.

The bead portion 303 may be further provided with a rubber layer, a cord layer, or the like for the purpose of reinforcement. Such additional members may be provided at various positions of the carcass 205 and bead filler 210.

The inner liner 212 may be composed of a rubber layer mainly made of butyl rubber, a film layer mainly made of resin, or a combination thereof.

A tire inner surface, in order to reduce cavity resonance, may have a porous member, or may be subjected to electrostatic flocking processing.

Also, the tire inner surface may have a sealant member for preventing air leakage in case of puncture.

The tire of the present embodiment may have the sidewall portion 302 including crescent-shaped reinforcing rubber, thereby functioning as a side-reinforced run flat tire.

EXAMPLES

Figure 6:
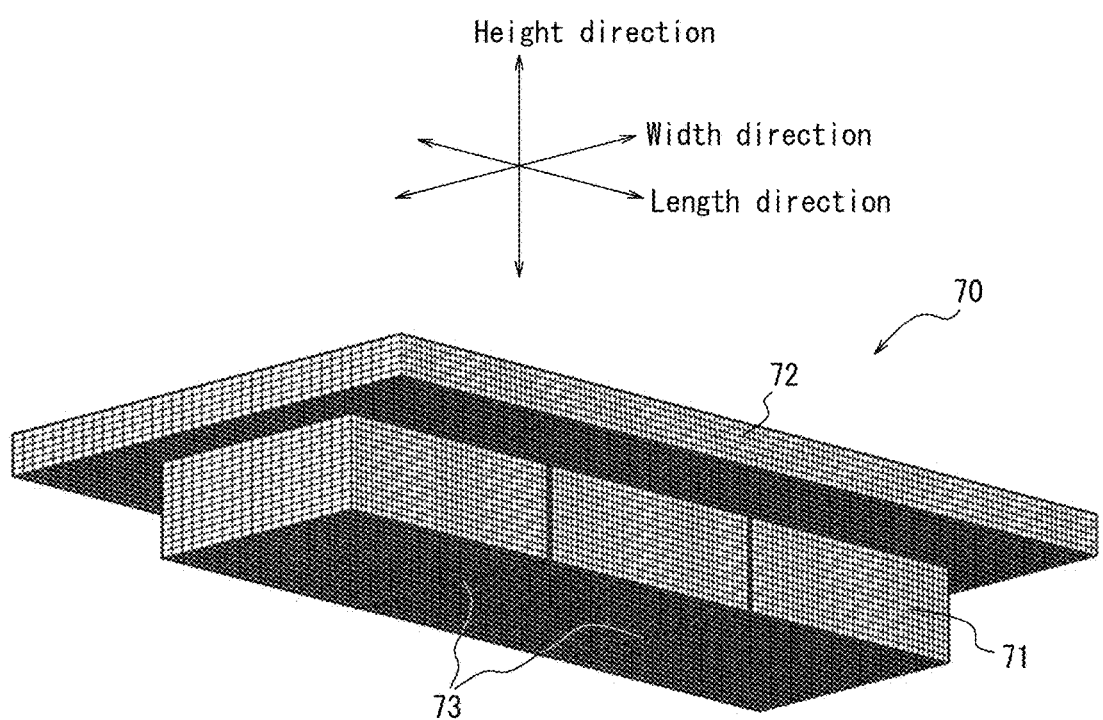
FIG. 6 is a diagram illustrating an FEM calculation.

To confirm the effects of the present invention, tires of Examples 1 to 5 and Comparative Example 1 were evaluated by conducting simulations and experiments. For each of the tires, block models 70 in the same shape having different sipes and block samples having the same structure as the block model 70 were prepared. Each of the block models 70, as illustrated in FIG. 6, includes a block portion 71 formed in the shape of a rectangular parallelepiped with 60 mm in length×20 mm in width×9 mm in height and a base portion 72 fixed to an upper surface of the block portion 71 and extending longer than the block portion 71 in a longitudinal direction and a width direction. The block portion 71 is provided with two sipes 73 with specifications shown in Table 1. These two sipes 73, at respective positions, remote from either end of a longitudinal direction of the block portion 71 by 20 mm and extend throughout the width and height of the block portion 71 along a width direction and a height direction thereof.

Note that, in the block model 70 prepared for the evaluation of the tires of Examples 1 to 5, as illustrated in the example of FIGS. 1A and 1B, in each virtual plane mentioned above at a position corresponding to the predetermined depth direction position P1 and the predetermined extending direction position P2, the sipe has one of the pair of sipe walls facing each other linearly extending and the other extending along the curved shape protruding outward from the sipe 4. On the other hand, in the block model 70 prepared for the evaluation of the tire of Comparative Example 1, the sipe has a constant width throughout the sipe.

In Table 1, "P1 (%)" represents a ratio of a depth direction distance between the tread surface of the block model 70 and the predetermined depth direction position P1 to a sipe depth. In Table 2, also, "P2 (%)" represents a ratio of a length along the sipe extending direction between one end thereof and the predetermined extending direction position P2 to a sipe extending length.

Each of the tires was subjected to a wear resistance test described below.

(Wear Resistance Test)

First, by using a FEM (Finite Element Method) calculation, in a state in which the block model 70 was pressed against a road surface model and having a load of 300 kPa applied thereto and the shear force with shear strain within a range of 5 to 10% acting thereon, shear rigidity of the block portion 71 was calculated. Also, an actual block sample similar to the block model 70 was prepared and, under the same condition as described above, the shear force was applied by an experiment, and the sheer rigidity at that time was obtained. Then, based on a result of the calculation using the FEM calculation and a result of the test using the block sample, the sheer rigidity was obtained.

Also, by using the FEM calculation, the shear force acting on each block sample was estimated.

Then, wear energy was estimated based on the shear rigidity and the shear force obtained in the above manner, and the wear energy thus estimated was evaluated as wear performance of each of the above tires represented by a relative index. Results of the evaluations were shown in Table 1 set forth below. Note that in Table 1 the larger the index representing the result of the evaluation, the better the wear resistance.

TABLE 1

|  | Example 1 | Example 2 | Example 3 | Example 4 | Example 5 | Comparative Example 1 |
|---|---|---|---|---|---|---|
| Shape of sipe | FIGS. 1A and 1B | FIGS. 1A and 1B | FIGS. 1A and 1B | FIGS. 1A and 1B | FIGS. 1A and 1B | FIG. 4 |
| A-A' (mm) | 0.2 | 0.4 | 0.8 | 1.0 | 1.2 | 0.3 |
| B-B', C-C' (mm) | 0.1 | 0.3 | 0.6 | 0.8 | 1.0 | 0.3 |
| D-D' (mm) | 0.1 | 0.3 | 0.5 | 0.8 | 1.0 | 0.3 |
| E-E' (mm) | 0.0 | 0.0 | 0.2 | 0.6 | 0.8 | 0.3 |
| P1 (%) | 10 | 30 | 42 | 70 | 90 | — |
| P2 (%) | 20 | 40 | 50 | 60 | 80 | — |
| Wear resistance (index) | 104 | 108 | 120 | 107 | 101 | 100 |

As can be seen in Table 1, it was found that the tires of Examples 1 to 5, as compared with the tire of Comparative Example 1, may obtain excellent wear resistance.

INDUSTRIAL APPLICABILITY

The disclosure herein may be used in the pneumatic tire of any type such as a general tire (a summer tire or an all-season tire) non-specialized for ice or snow.

REFERENCE SIGNS LIST 1, 100: tread surface, 4, 40-43, 73, 400: sipe, 6: 3D sipe, 10-13: circumferential groove, 20-22: rib-like center land portion, 23, 24: rib-like shoulder land portion, 30, 31: lug groove, 50: tread rubber, 60: vertical portion, 61: bending portion, 62: first inclined portion, 63: second inclined portion, 70: block model, 71: block portion, 72: base portion, 200, 201: inclined belt layer, 202: circumferential cord layer, 203: belt, 205: carcass, 205a: carcass body, 205b: carcass turn-up portion, 205c: carcass turn-up end, 301: tread portion, 302: sidewall portion, 303: bead portion, 210: bead filler, 211: bead core, 212: inner liner, CWP: carcass maximum width position, E: tire equatorial plane, P1: predetermined depth direction position, P2: predetermined extending direction position, Q1: first sub-bending point, Q2: second sub-bending point, R: applicable rim, TE: tread ground contact edge, TWP: tire maximum width position

The invention claimed is:

1. A pneumatic tire having, on a tread surface, a sipe extending in a direction intersecting a tire circumferential direction, wherein
a sipe width of the sipe:
becomes maximum at a predetermined depth direction position P1 between both ends of the sipe in a sipe depth direction, at a predetermined extending direction position P2 between both ends of the sipe in a sipe extending direction,
continuously increases in a smooth manner without becoming constant in the middle, at the predetermined depth direction position P1, along the sipe extending direction from the both ends of the sipe in the sipe extending direction to the predetermined extending direction position P2,
continuously increases in a smooth manner without becoming constant in the middle, at the predetermined extending direction position P2, along the sipe depth direction from the both ends of the sipe in the sipe depth direction to the predetermined depth direction position P1,
the sipe has a pair of sipe wall surfaces facing each other, in a first virtual plane parallel to the tread surface at the predetermined depth direction position P1 and in a second virtual plane along the sipe depth direction and a sipe width direction at the predetermined extending direction position P2, respectively, at least one of the sipe wall surfaces extends along a curved shape protruding outward from the sipe, and
in the first virtual plane and in the second virtual plane, respectively, the curved shape extends from both ends of the sipe.

2. The pneumatic tire according to claim 1, wherein a maximum value of the sipe width of the sipe is 1.0 mm or less.

3. The pneumatic tire according to claim 1, wherein the sipe width at the predetermined depth direction position P1 at the predetermined extending direction position P2 of the sipe is 0.4 to 10 mm,
the sipe width at both ends of the sipe in the sipe extending direction at the predetermined depth direction position P1 of the sipe is 0.3 to 0.8 mm,
the sipe width at an end of the sipe in the sipe depth direction on a tread surface side at the predetermined extending direction position P2 is 0.3 to 0.8 mm, and
the sipe width at an end of the sipe in the sipe depth direction on a sipe bottom side at the predetermined extending direction position P2 is 0 to 0.6 mm.

4. The pneumatic tire according to claim 1, wherein
the predetermined depth direction position P1 is located at a position remote from the tread surface by 30 to 70% of a sipe depth in the sipe depth direction, and
the predetermined extending direction position P2 is located at a position remote from one end of the sipe in the sipe extending direction by 40 to 60% of a sipe extending length along the sipe extending direction.

5. The pneumatic tire according to claim 2, wherein
the predetermined depth direction position P1 is located at a position remote from the tread surface by 30 to 70% of a sipe depth in the sipe depth direction, and
the predetermined extending direction position P2 is located at a position remote from one end of the sipe in the sipe extending direction by 40 to 60% of a sipe extending length along the sipe extending direction.

6. The pneumatic tire according to claim 3, wherein
the predetermined depth direction position P1 is located at a position remote from the tread surface by 30 to 70% of a sipe depth in the sipe depth direction, and
the predetermined extending direction position P2 is located at a position remote from one end of the sipe in the sipe extending direction by 40 to 60% of a sipe extending length along the sipe extending direction.

7. The pneumatic tire according to claim 1, wherein, in the first virtual plane and in the second virtual plane, respectively, one of the sipe wall surfaces linearly extends while the other extends along a curved shape protruding outward from the sipe.

8. The pneumatic tire according to claim 1, wherein, in the first virtual plane and in the second virtual plane, respectively, the pair of sipe wall surfaces extend along a curved shape protruding outward from the sipe.

9. The pneumatic tire according to claim 1, wherein, in the first virtual plane and in the second virtual plane, respectively, one of the sipe wall surfaces extends along a curved shape protruding in the same direction as the other sipe wall surface.

* * * * *